United States Patent Office 3,527,705
Patented Sept. 8, 1970

3,527,705
BIS-ALKANYLAMIDES OF ALKYLENEDIAMINES
Donald Henry Foelsch, Williamsport, Pa., assignor to Glyco Chemicals, Inc., New York, N.Y., a corporation of Pennsylvania
No Drawing. Filed Feb. 17, 1967, Ser. No. 616,768
Int. Cl. C10m 7/34
U.S. Cl. 252—51.5  10 Claims

ABSTRACT OF THE DISCLOSURE

This invention involves a class of mixtures of diamides of the formula

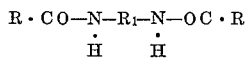

wherein $R_1$ is the divalent alkylene group of 1,4-diaminocyclohexane, methylenediamine, ethylenediamine, or other omega,omega'-(open chain)alkylenediamine having from 3 to about 12 carbon atoms; and R·CO is the mixture of acyl groups of the mixture of primarily fatty acids predominately methyl branched-chain fatty acids (60 to about 70 percent having 18 carbons, one to 3 percent having 14 carbons, 3 to 7 percent having 16 carbons), one to 11 percent being myristic acid, 4 to 10 percent being palmitic acid, one to 6 percent of each of stearic and oleic acids, and a residual about 4 to about 10 percent composed of small amounts of each of cyclopentanioc and cyclohexanoic acids, ethyl branched-chain fatty acids of 14 to 18 carbons, and methyl branched-chain cyclopentanoic and cyclohexanoic acids; the entire mixture of all of which alkanoic acids (including the two cyclic acids) being the by-product obtained after separating the dimer acids produced in the dimerization of linoleic acid with subsequent hydrogenation.

---

The invention is that of a class of mixtures of diamides of the formula

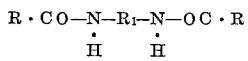

wherein $R_1$ is the divalent alkylene group of an aliphatic diamine such as 1,4-diaminocyclohexane, methylenediamine, ethylenediamine, or an omega,omega'-(open chain)-alkylenediamine with its divalent alkylene group having from 3 to about 12 carbon atoms. R·CO is the mixture of acyl groups of a mixture of alkanoic acids, i.e. fatty acids and cyclopentanoic and cyclohexanoic acids, by far predominating in methyl branched-chain fatty acids having 14 to 18 carbon atoms with a greater portion of from about 60 to 76 percent of the mixture being methyl branched-chain fatty acids having 18 carbon atoms, about one to about 3 percent having 14 carbons, about 3 to about 7 percent having 16 carbons, about one to about 11 percent being myristic acid, about 4 to about 10 percent being palmitic acid, about one to about 6 percent of each of stearic and oleic acids, and a residual about 4 to about 10 percent composed of small amounts of each of cyclopentanoic and cyclohexanoic acids, ethyl branched-chain fatty acids of 14 to 18 carbons, and methyl branched-chain cyclopentanoic and cyclohexanoic acids; with said entire mixture of alkanoic acids being obtained after separating the dimer acids produced in the dimerization of linoleic acid and subsequent hydrogenation of the dimerization product.

The expression "alkanoic acids" is used herein and in the appended claims in the broad sense to embrace not only the various hereinabove disclosed open chain fatty acids but also the there also disclosed cyclo-aliphatic acids, namely, cyclopentanoic and cyclohexanoic acids, and methyl branched-chain cyclopentanoic and cyclohexanoic acids.

The hereinabove disclosed broad scope mixture of starting alkanoic acids said to be obtained from separating the dimer acids produced in the dimerization of linoleic acid and subsequent hydrogenation of its dimerization product, briefly can be called the "hydrogenated-dimerized linoleic acid by-product mixed alkanoic-alkenoic acids" or even only as "mixed by-product acids." These by-product mixed alkanoic-alkenoic acids embrace the various embodiments of these by-product mixed acids containing different amounts of any of their included respective individual acids but each within the respective range just earlier given for it.

One such specific embodiment of the by-product mixed alkanoic-alkenoic acids consists essentially of from about 7 to about 11 percent of myristic acid, from about 4 to about 5 percent of palmitic acid, from about 6 to about 7 percent of methyl branched-chain fatty acids having 16 carbon atoms, from about one to about 2 percent of stearic acid, from about 70 to about 76 percent of methyl branched-chain fatty acids having 18 carbon atoms, from about one to about 2 percent of oleic acid, and a remainder of about 4 percent composed of small amounts of each of ethyl branched-chain fatty acids having from 14 to 18 carbon atoms, of cyclopentanoic and cyclohexanoic acids, and of methyl branched chain cyclopentanoic and cyclohexanoic acids.

This specific embodiment of said by-product mixed acids is later herein briefly called the "linoleic dimerization hydrogenation 3185 by-product acids mixture." It is obtainable from Emery Industries, Inc., of Cincinnati, Ohio, as their Emery 3185–D Isostearic Acid.

A further embodiment of these by-product mixed alkanoic-alkenoic acids, available from the same source as Emery 3101–D Isostearic Acid (briefly called "3101 by-product mixed acids"), consists essentially of from about one to about 3 percent of myristic acid, from about one to about 3 percent of methyl branched-chain fatty acids having 14 carbon atoms, from about 6 to about 10 percent of palmitic acid, from about 3 to about 5 percent of methyl branched-chain fatty acids having 16 carbon atoms, from about 4 to about 6 percent of stearic acid, from about 60 to about 70 percent of methyl branched-chain fatty acids having 18 carbon atoms, from about 4 to about 6 percent of oleic acid, and a remainder of about 10 percent composed of small amounts of ethyl branched-chain fatty acids having from 14 to 18 carbon atoms, of cyclopentanoic and cyclohexanoic acids, and of methyl branched-chain cyclopentanoic and cyclohexanoic acids.

The various mixed diamides of this invention are generally soft, sticky or tacky, light amber to yellow solids, with individual mixtures melting at respectively individual ranges within an overall range from about 90 to about 125° C., and being soluble to different extents at ambient temperatures in some oxygenated aliphatic solvents such as ethanol, isopropanol, methyl ethyl ketone, chlorinated hydrocarbons such as chloroform, and trichlorethane, aliphatic hydrocarbons as kerosene, and aromatic hydrocarbons as toluene.

The various mixed diamides of the invention are useful as additive to, and particularly metal-to-metal contact, lubricants. As additives to such lubricants they serve to toughen the lubricating film and improve its adhesion to the metal surfaces, and particularly to extend the life and service range of extreme pressure lubricants. In such lubricant additive use, the mixed diamides of the invention are heated to from at least their softening point to their melting point, and in such fluid form are admixed in an amount from about 0.5 to about 10 percent of the particular lubricant, with or without increasing the latter's temperature, depending on its properties and those of the particular diamides mixture and the particular service conditions under which the so modified lubricant will be used.

The surface gloss of various so-called hot melt coatings, for example, the hot melt mixed polyvinyl acetate (about 30%) and paraffin (about 70%) coating such as is used for making coated paper for food wrapping, is improved by incorporating in them as an additive, say, from about 3 to about 10 percent by weight, and apparently optimally around 3 percent, of a diamides mixture of the invention. An example is the N,N'-diamides mixture obtained from ethylenediamine and the 3101 by-product mixed as in Example 1 below.

Moreover, adding the aforesaid diamides to such hot melt coatings and within the range indicated serves to reduce the melted viscosity of the coating as well as to improve its flow and spreadability, in addition to providing desirably enhanced gloss to the finished coat. The resulting hot melt coating with the admixed diamides hereof incorporated in it can be applied in the usual manner in customary thickness, for example, of 5 mils, for example, by use of the Gardner knife and feeding the melt coating to it at a temperature of about 150° C.

The mixed diamides of the invention are prepared by admixing the selected initially above described aliphatic diamine reactant (which has at least two carbons in its divalent alkylene group $R_1$) into the selected embodiment of the by-product mixed acids reactant, while stirring it at an elevated temperature and under an inert gas (e.g. nitrogen or carbon dioxide), at a rate to avoid excessive foaming. The diamine is added to an extent to have at least, and advantageously just slightly above, two moles of the acids mixture per mole of diamine, while continuing the agitation and heating to maintain a suitable reaction temperature, such as about 160° C., and allowing the water formed by the reaction to escape, until the diamide formation is substantially complete, for example, when test samples show less than 6 percent, and beneficially under 5 percent, of unreacted alkanoic acid remains. The reaction mixture then is cooled to a convenient temperature at which it still is fluid, such as about 120 to 125° C., and the product is poured off into suitable containers.

As methylenediamine is not available, the corresponding methylene bis-(mixed)alkylamides is prepared by first reacting the by-product mixed acids with thionyl chloride to obtain the corresponding mixed acyl halides. The latter is reacted with ammonia, as by using ammonium hydroxide, to obtain the corresponding (mono) amide which latter then is reacted with formaldehyde (provided, for example, in the form of paraformaldehyde) to yield the desired methylene bis-(mixed)alkylamide.

Open chain aliphatic diamines, in addition to those named earlier above, as applicable for preparing the mixed diamides of the invention, include also trimethylenediamine or 1,3-diaminopropane, tetramethylenediamine or 1,4-diaminobutane, pentamethylenediamine or 1,5-diaminopentane, 1,4-diamino-2-methylpentane, heptamethylenediamine, octamethylenediamine, 2,5-diamino-2,5-dimethylhexane, nonamethylenediamine, 2,6-diamino-2,6 - dimethylheptane, decamethylenediamine, undecamethylenediamine, and dodecamethylenediamine.

The mixed diamides of the invention are illustrated by, but not restricted to, the following examples:

EXAMPLE 1

Mixed diamides from ethylenediamine 912.2 grams (2.92 moles) of the 3101 by-product acids mixture were fed into a 2-liter, 3-necked, round bottom flask equipped with a heating mantle, thermometer, stirrer, and inert gas addition tube. A small but steady flow of nitrogen (as the inert gas) was fed through the gas addition tube and under the surface of the liquid 3101 acids mixture which, while being stirred, was heated to 160° C.

Then 87.8 grams (1.46 moles) of ethylenediamine (on the anhydrous basis) were added slowly during continued stirring. The heating was continued, as control of the foaming permitted, until the reaction mixture reached 160° C. The reaction mass then was held at 160° C. for about four hours while the stirring continued, during which time water resulting from the reaction escaped through a vent. A small sample (about 5 grams) of the reaction mass then was removed for determination of the quantity of unreacted ethylenediamine and free fatty acid. The reaction was continued at 160° C., with periodic testing withdrawn samples for residual alkanoic acid until the unreacted acid was reduced to less than 6 percent (of the reaction mass).

When the reaction was complete, the reaction mass was cooled, with continued stirring, to about 120 to 125° C. and the product then poured into suitable containers. The resulting mixed diamides product is a soft, sticky, cream to amber colored solid having a free alkanoic acid content of under 6 percent and a melting point range of 100 to 110° C.

The product of another separate run, using 2,737 grams (8.767 moles) of the 3101 by product acids mixture and 263 grams (4.383 moles) of ethylenediamine, at ambient temperature of 25° C. was a soft, tacky solid showing a hardness (penetration of 200 gms. in 1 minute) of 1.73 centimeters, acid value of 7.2, neutralization value 0.1, color (Gardner 1933 scale) 7+, and melting point from 103 to 107° C.

Average of repeated runs shows recovery by weight usually approximately 90 to 95 percent. In some runs, during the continuation of the reaction after the first four hours, addition of small quantities of ethylenediamine occasionally are necessary to replace entrainment losses and obtain the desired low, unreacted alkanoic acid level.

EXAMPLE 2

Mixed diamides from hexamethylenediamine

The procedure described in Example 1 was repeated except that 843.1 grams (2.7 moles) of the 3101 by-product acids mixture were used and its ethylenediamine was replaced by 156.9 grams (1.35 moles) of hexamethylenediamine. The product was a soft, sticky, cream to amber colored solid having a free alkanoic acid content of less than 6 percent, and a melting point range of 90 to 100° C. Average of several runs showed a 90 to 95 percent recovery of the corresponding diamides mixture generally was obtained.

The product of another separate run, using 379.4 grams (1.215 moles) of the 3101 by-product acids mixture and 70.6 grams (0.6075 mole) of hexamethylenediamine, at ambient temperature of 25° C. was a soft, tacky solid showing a hardness (penetration of 200 grams in 1 minute) of 1.2 centimeters, acid value of 10.4, neutralization value of 0.1, color (Gardner 1933 scale) 11+, and melting point from 92 to 94° C.

EXAMPLE 3

Mixed diamides from 1,4-diaminocyclohexane

The procedure described in Example 1 was repeated except that 845.6 grams (2.708 moles) of the 3101 by-product acids mixture were used, and its ethylenediamine was replaced by 154.4 grams (1.354 moles) of 1,4-diaminocyclohexane. The product was a soft, sticky, cream to amber colored solid having a free alkanoic acid content of less than 6 percent, and a melting point range of 115 to 125° C. Average of several runs showed a 90 to 95 percent recovery of the corresponding diamides mixture generally was obtained.

The product of another separate run, using 379.7 grams (1.216 moles) of the 3101 by-product acids mixture and 70.3 grams (0.608 mole) of 1,4-diaminocyclohexane, at ambient temperature of 25° C. was a soft, tacky solid showing a hardness (penetration of 200 grams in 1 minute) of 2.60 centimeters, acid value of 11.6, neutralization value of 0.3, color (Gardner 1933 scale) 7+, and melting point from 117 to 122° C.

The 3101 by-product acids mixture of any of Examples 1, 2 and 3 can be replaced by similar molar amounts of any other of the by-product mixed alkanoic-alkenoic acids with its various acid constituents within the respective ranges for them recited earlier above. Such substitution, for example, with the other specific embodiment called the linoleic dimerization hydrogenation 3185 by-product acids mixture is seen in the following:

EXAMPLE 4

Mixed diamides from 3185 acids mixture and ethylenediamine 407.3 grams (1.4098 moles) of the linoleic dimerization hydrogenation 3185 by-product acids mixture were fed into a reaction vessel equipped, and in the same manner, as in Example 1 and heated and treated as therein with the following variations:

42.7 grams (0.7044 mole) of ethylenediamine then were added and the reaction mixture heated to 160° C. and held at 160 to 163° C. for about 3 hours when a sample taken of the reaction mass showed 11.2% of unreacted alkanoic acid. The reaction mass then was heated at the same temperature range for another hour and then allowed to cool to about 130° C. and poured into suitable containers. The 422 grams of final product mixed diamides was a soft, sticky amber solid (slightly harder than the product of Example 1) with acid value 9.2, neutralization value 0.13, color 8+ (Gardner 1933), melting point 111 to 113° C., and penetration (200 grams in one minute) 1.49 centimeters.

The specific starting diamine of any of the foregoing examples can be replaced by the corresponding molar equivalent weight of any other of the diamines disclosed hereinabove, to yield correspondingly similar end product mixed diamides of the respectively specific diamine and particular specific embodiment of by-product mixed acids. Each such resulting additional specific example thus is referred to as if it specifically were written out herein in full just like any of the complete Examples 1 to 4; thereby to avoid unduly extending this specification.

The corresponding mixed diamides, wherein $R_1$ of the earlier above diamine moiety is merely the divalent methylene radical —$CH_2$—, are prepared by the following only illustrative, but not deemed to be restricting, procedure:

EXAMPLE 5

Methylene-bis-(mixed)alkylamides 301.1 grams (2.547 moles) of thionyl chloride were fed into a 3-necked round bottom flask fitted with agitator, thermometer, Friedrichs condenser, and dropping funnel, and submerged in an ice water bath. 696.9 grams of 3101 by-products acids mixture were added dropwise with the reaction mixture temperature being steadily raised, and addition continuing with the reaction mixture developing a clear dark red color, and general refluxing starting at 45° C. The temperature was increased and all of the acids mixture was added when the temperature was at 50° C.

The temperature still was increased with gentle reflux up to 100° C. when the heating was stopped and the reaction allowed to cool. 14 grams of the cooled reaction product distilled under 2 mm. Hg over a boiling range of 101 to 160° C. gave 9.1 grams of a pale yellow distillate. The infrared graph for it showed the characteristic peaks to identify it as the mixed acyl chlorides of the alkanoic acid constituents of the starting 3101 by-product acids mixture.

The rest of the reaction product then was distilled under vacuum. Distillate was collected at 7 mm. Hg at a pot temperature of 180° C. and continued to 217° C. under 3 mm. A total of 517.3 grams of the mixed alkanoyl chlorides (70.1% of theory) was recovered.

Conversion of alkanoyl chlorides to corresponding (mono)amide: The mixed alkanoyl chlorides just obtained were fed into 200 ml. of ammonium hydroxide (28% $NH_3$) at room temperature in a Waring Blendor. After about 25 grams of the mixed chlorides had been added under mixing at low speed, the mixture slurry became too thick to enable further mixing, and was poured into a beaker. Another 200 ml. of ammonium hydroxide were added to the blender and a further 25 grams of the mixed chlorides was added under low speed mixing.

The resulting slurry was added to the first slurry. Their mixture was diluted with an additional 100 ml. of ammonium hydroxide and then with 200 ml. of distilled water to give a reasonably fluid slush. 350 ml. of isopropyl alcohol (99%) were added and the slush warmed on the steam bath sufficiently to dissolve the slurry solids, yielding a cloudy solution having fine oil droplets dispersed in it. That dispersion was allowed to separate for an hour on the steam bath. The clear oily layer separated at the top was removed.

The cloudy aqueous layer then was allowed similarly to separate and the resulting upper oily layer was removed and added to the first one. The still remaining water layer likewise was allowed to separate. From the resulting two layers, the water layer was discarded and the oil layer combined with the combined earlier two oil portions. 200 ml. of distilled water were added, yielding a milky, stable emulsion which was heated to its boiling point and enough anhydrous sodium sulfate added to salt out the fatty material.

The clear fatty layer was separated and the rinsings of the apparatus with isopropyl alcohol were added to it. Enough isopropyl alcohol then was added to give a total volume of about 400 ml. The resulting solution, transferred to a one liter single-neck round bottom flask, was evaporated (using the rotary evaporator) under vacuum over hot water bath, yielding a slush of sodium sulfate and the mixed (mono)amides of the starting by-product mixed alkanoic-alkenoic acids. The sodium sulfate was removed by taking up the slush in 300 ml. of petroleum ether and filtering.

The filtrate, taken to dryness over the steam bath, yielded 37.69 grams of the dry mixed mono-amides. The latter product, taken up in 100 ml. of warm petroleum ether and again evaporated to dryness (using rotary vacuum drier), yielded 36.9 grams of final product as a soft, amber solid at ambient temperature (softening point 48° C.). Infrared examination confirmed it to be the primary (mono) amide of the original acids mixture.

Converting the (mono) amides to mixed diamines: 20 grams (0.064 mole) of the latter mixed (mono) amides and 1.1 grams (0.032 mole) of paraformaldehyde (91%) were admixed in a half liter, single neck, round bottom flask. 250 ml. of isopropanol and several boiling chips were added, followed by 3 drops of concentrated hydrochloric acid. The flask was fitted with a water-cooled Allihn condenser, and the contents heated until they refluxed steadily. The mixture was a cloudy pale yellow (due to undissolved paraformaldehyde).

After an hour and a half, 3 more drops of concentrated hydrochloric acid were added and the refluxing continued overnight. In the morning a 5 ml. sample of the still pale yellow cloudy mixture was removed, evaporated to dryness over steam bath, yielding 0.34 gram solid. The infrared graph on it showed no conversion to the methylene bis-amide sought. 2.59 grams of hydrochloric acid (37%) were added (giving a mole ratio of the mono-amide to paraformaldehyde to HCl of 2 to 1 to 1), and the refluxing continued for seven hours and a half.

Another 5 ml. sample was taken, filtered and evaporated to dryness and the residue subjected to infrared test. This showed that the primary amide decreased slightly, but some ester-like material was present. The refluxing was continued overnight when another 5 ml. sample was drawn, filtered and evaporated to dryness. Infrared test on it indicated a large portion of secondary amide present with very little primary amide. A strong carbonyl and also oxy band indicated probable presence of isopropyl isostearate.

The reaction mixture then was gravity filtered through filter paper. The white crystalline residue was found to be ammonium chloride. The filtrate then was boiled to distill off isopropanol. 190 ml. of it were collected in an hour and three-quarters. The rest of the reaction mixture was brought to dryness over the water bath (using rotary drier). The residue, a slush of crystals within a soft greasy solid, was taken up in hot petroleum ether and the ammonium chloride crystals were filtered off.

300 ml. of petroleum ether were admixed into the filtrate. Since this diluted solution would not filter readily, the petroleum ether was evaporated off. From a small portion of the residue boiled in dilute aqueous NaOH solution, a fatty layer separated. Taking that layer up in ethyl ether and evaporating it to dryness, infrared check on the residue showed that none of the ester was removed.

13.89 grams of that residue was charged into a half liter, single-neck, round bottom flask. 200 ml. of isopropanol were added and the solution was warmed to dissolve the residue. 2.5 grams of KOH pellets were added. A water-cooled reflux condenser was attached and the reaction mass refluxed for an hour. The flask contents was poured into 1800 ml. of water, heated to boiling, and sufficient sodium sulfate was added to salt out the mixed diamides. These separated as an oily layer on top of the aqueous solution.

After both remained standing together overnight, the separated fatty diamides layer was removed and washed twice in 300 ml. of boiling water containing sodium sulfate each time to salt out the fatty layer. The latter was dissolved in isopropanol, and their resulting solution was dried with anhydrous sodium sulfate, and filtered. The isopropanol solution filtrate was evaporated to dryness (in a rotary drier), and the dried residue dissolved in ethyl ether. A small sample portion was filtered and its filtrate evaporated to dryness over a steam bath. Infrared examination of the residue showed no ester band, but did show characteristic bands identifying methylene bis-(mixed-alkyl) amides of the 3185 by-product acids mixture.

The rest of the isopropanol solution of the fatty layer then was filtered. Its filtrate, evaporated to dryness, yielded 4.65 grams of a soft, amber, tacky solid, melting (U.S.P. Class II M.P.) at about 73° C. 5 grams of this mixed diamides, added to 95 grams of mineral oil, dissolved on heating the oil to 70° C. The resulting solution, allowed to cool under simply ambient conditions, set to a clear, non-pourable elastic gel resembling corresponding firm, non-pourable, elastic gels similarly obtained when a 5 percent solution of the mixed diamides of each of the other examples was allowed to cool under ambient conditions.

The foregoing procedure for preparing the methylene bis-(mixed alkyl) amides (from the 3101 by-product acids mixture) can be modified to improve its efficiency and yield. So also, the 3101 by-product acids mixture used in Example 5 can be replaced by equivalent amounts of the 3185 by-product acids mixture used in Example 4, or by similar molar amounts of any other of the by-product mixed acids with its various acid constituents within the respective ranges for them recited earlier above.

The cream to amber, soft, sticky or tacky mixed alkylene bis-(alkyl)diamides of the invention, derived from the by-product mixed acids indicate generally a tendency to retain their soft consistency over a wide temperature span from ambient to well below 0° C., for example, even as low as minus 40° C. They are non-brittle, non-frangible and cannot be disintegrated by ordinary crushing or grinding, and so do not show conchoidal fracture but rather only can be cut or torn apart. In the latter case they would show a generally irregular torn surface.

While the invention has been explained by detailed descriptions of certain specific embodiments of it, it is understood that various changes or substitutions may be made in any of them within the scope of the appended claims which are intended also to cover equivalents of the various embodiments.

What is claimed is:

1. A mixture of diamides having the formula

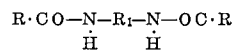

wherein

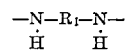

is the moiety of an aliphatic diamine member of the class consisting of 1,4-diaminocyclohexane, methylenediamine, ethylenediamine, and an omega,omega'-(open chain)-alkylenediamine wherein $R_1$ has from 3 to about 12 carbon atoms; and R·CO is the acyl group residue of the mixture of fatty acids consisting essentially of from about one to about 11 percent of myristic acid, from about one to about 3 percent of methyl branched-chain fatty acids having 14 carbon atoms, from about 4 to about 10 percent of palmitic acid, from about 3 to about 7 percent of methyl branched-chain fatty acids having 16 carbon atoms, from about one to about 6 percent of stearic acid, from about 60 to about 76 percent of methyl branched-chain fatty acids having 18 carbon atoms, from about one to about 6 percent of oleic acid, and a remainder of from about 4 to about 10 percent composed of small amounts of each of ethyl branched-chain fatty acids having from 14 to 18 carbon atoms, of cyclopentanoic and cyclohexanoic acids, and of methyl branch-chain cyclopentanoic and cyclohexanoic acids.

2. The diamides mixture as claimed in claim 1, wherein the said mixture of fatty acids consists essentially of from about 7 to about 11 percent of myristic acid, from about 4 to about 5 percent of palmitic acid, from about 6 to about 7 percent of methyl branched-chain fatty acids having 16 carbon atoms, from about one to about 2 percent of stearic acid, from about 70 to about 76 percent of methyl branched-chain fatty acids having 18 carbon atoms, from about one to about 2 percent of oleic acid, and a remainder of about 4 percent composed of small amounts of each of ethyl branched-chain fatty acids having from 14 to 18 carbon atoms, of cyclopentanoic and cyclohexanoic acids, and of methyl branched-chain cyclopentanoic and cyclohexanoic acids.

3. The diamides mixture as claimed in claim 2, wherein

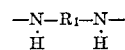

is the moiety of an open chain alkylene diamine having from one to about 12 carbon atoms.

4. The diamides mixture as claimed in claim 3, wherein the alkylene diamine is ethylenediamine.

5. The diamides mixture as claimed in claim 1, wherein the said mixture of fatty acids consists essentially of from about one to about 3 percent of myristic acid, from about one to about 3 percent of methyl branched-chain fatty acids having 14 carbon atoms, from about 6 to about 10 percent of palmitic acid, from about 3 to about 5 percent of methyl branched-chain fatty acids having 16 carbon atoms, from about 4 to about 6 percent of stearic acid, from about 60 to about 70 percent of methyl branched-chain fatty acids having 18 carbon atoms, from about 4 to about 6 percent of oleic acid, and a remainder of about 10 percent composed of small amounts of ethyl branched-chain fatty acids having from 14 to 18 carbon atoms, of cyclopentanoic and cyclohexanoic acids, and of methyl branched-chain cyclopentanoic and cyclohexanoic acids.

6. The diamides mixture as claimed in claim 5, wherein

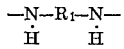

is the moiety of an open chain alkylene diamine having from one to about 12 carbon atoms.

7. The diamides mixture as claimed in claim 6, wherein the alkylene diamine is methylenediamine.

8. The diamides mixture as claimed is claim 6, wherein the alkylene diamine is ethylenediamine.

9. The diamides mixture as claimed in claim 6, wherein the alkylene diamine is hexamethylenediamine.

10. The diamide mixture as claimed in claim 2, wherein

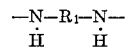

is the moiety of 1,4-diaminocyclohexane.

References Cited

UNITED STATES PATENTS

| | | | |
|---|---|---|---|
| 2,380,925 | 8/1945 | Cheyney | 260—36 |
| 2,464,855 | 3/1949 | Duggan | 260—32.6 |
| 2,132,388 | 10/1938 | Berchet | 260—404 |
| 3,219,666 | 11/1965 | Norman | 260—268 |

FOREIGN PATENTS

| | | |
|---|---|---|
| 624,839 | 8/1961 | Canada. |

DANIEL E. WYMAN, Primary Examiner

P. M. FRENCH, Assistant Examiner